United States Patent [19]

Taub

[11] 4,047,183

[45] Sept. 6, 1977

[54] METHOD AND APPARATUS FOR CONTROLLING THE FORMATION AND SHAPE OF DROPLETS IN AN INK JET STREAM

[75] Inventor: Howard Hyman Taub, Mount Kisco, N.Y.

[73] Assignee: International Business Machines Corporation, Armonk, N.Y.

[21] Appl. No.: 738,777

[22] Filed: Nov. 4, 1976

[51] Int. Cl.[2] .................... G01D 15/13

[52] U.S. Cl. .................... 346/1; 346/75; 346/140 R

[58] Field of Search .................... 346/1, 75, 140 R; 356/28

[56] References Cited

U.S. PATENT DOCUMENTS

| | | | |
|---|---|---|---|
| 3,769,627 | 10/1973 | Stone | 346/75 |
| 3,907,429 | 9/1975 | Kuhn et al. | 346/75 X |

OTHER PUBLICATIONS

Chan; W. H. et al., Feedback for Synchronized Pressure Jet Using Optical Sensor, IBM Tech. Disc. Bulletin, May 1974, vol. 16, No. 12, pp. 3877–3878.

*Primary Examiner*—George H. Miller, Jr.
*Attorney, Agent, or Firm*—Jack M. Arnold

[57] ABSTRACT

Method and apparatus is described for controlling the formation and shape droplets in an ink jet stream. The continuous portion of the stream is illuminated with a radiant energy source such as a laser. The surface wave profile produced by illuminating the stream is sensed to provide the fundamental and harmonic frequency components thereof. A perturbation drive signal, the amplitude and relative phase of which is a function of the sensed frequency components, is provided for controlling the formation and shape of the droplets.

10 Claims, 6 Drawing Figures

METHOD AND APPARATUS FOR CONTROLLING THE FORMATION AND SHAPE OF DROPLETS IN AN INK JET STREAM

BACKGROUND OF THE INVENTION

In recent years, significcant development work has been done in the field of ink jet printing. One type of ink jet printing involves electrostatic pressure ink jet, wherein electrostatic ink is applied under pressure to a suitable nozzle. The ink is thus propelled from the nozzle in a stream which is caused to break up into a train of individual droplets which must be selectively charged and controllably deflected for recording, or to a gutter. A droplet formation may be controlled and synchronized by a number of different methods available in the art including physical vibration of the nozzle, pressure perturbations introduced into the ink supply at the nozzle, etc. The resultof applying such perturbations to the ink jet is to cause the jet stream emerging from the nozzle to break into uniform droplets, often accompanied by smaller satellite droplets, at the perturbation frequency and at a predetermined distance from the tip of the nozzle. For some applied perturbations it is possible for drop formation without the formation of satellite droplets. It is of utmost necessity in such systems to precisely synchronize the application of the appropriate charging signal to the ink droplet stream at the precise time of droplet formation and break off from the stream. Means for supplying the selected electrostatic charge to each droplet produced by the nozzle conventionally comprises a suitable charging circuit and an electrode surrounding or adjacent to the ink stream at the location where the stream begins to form such droplets. Charging signals are applied between a point of contact with the ink and the charging electrode. A drop will thus assume a charge Q determined by the amplitude $V$ of the particular signal on the charging electrode at the time the drop breaks away from the jet stream, and the capacitance $C$ of the jet-charge electrode system, such that $Q=CV$. The capacitance $C$ may be influenced by changes in the geometry at the tip of the jet stream. The drop thereafter passes through a fixed electric field and the amount of deflection is determined by the amplitude of the charge on the drop at the time it passes through the deflecting field. A recording surface is positioned down stream from the deflecting means such that the droplet strikes the recording surface and forms a small spot. The position of the drop on the writing surface is determined by the deflection that the drop experiences, which in turn is determined by the charge on the droplet. By suitably varying the charge, the location at which the droplet strikes the recording surface may be controlled with the result that a visible, human readable, printed record may be formed upon the recording surface. U.S. Pat. No. 3,596,275 of Richard G. Sweet, entitled "Fluid Droplet Recorder" discloses such a recording or printing system.

The time that the drop separates from the fluid stream emerging from the nozzle is quite critical since the charge carried by the droplet is produced at that moment by electrostatic induction. Accordingly, it is seen that the formation of satellite droplets produces an error in the charging sequence, and therefore produces a misregistration of droplets on the printing medium. The field established by the charging signal is maintaind during drop separation, and the drop will carry a charge determined by the instantaneous value of the signal at break off and by the geometric configuration of the tip of the jet at the time of droplet formation, which determines the jet-charge electrode capacitance $C$. In order to place exact predetermined charges on individual droplets in accordance with successive video signals, it is necessary to know exactly the time of drop break off in relationship to the timing of the charge signal and the shape of the droplet at break off. Stated differently, the droplet break off time and the application of the charge signal must be precisely synchronized. Failure to properly synchronize drop break off and the charging signal results in very imprecise control of the printing process with attendant degradation of the print quality. In addition, it is important to maintain a predetermined break off geometry in order to provide constant charging efficiency.

Synchronization may also be important in the binary type electrostatic printing wherein on-charge drops are not deflected and proceed directly to impact recording medium, whereas charge drops are deflected to the gutter. U.S. Pat. No. 3,373,437 of Richard G. Sweet et al., entitled "Fluid Droplet Recorder With a Plurality of Jets" discloses such a recording or printing system.

In this type of system if synchronization is not correct such that the charging signal is in the process of either rising or falling at the time of drop break off, the exact charge of the drop will be some time function of the maximum charge signal rather than being fully charged. Such drops may be deflected by an amount too small to cause impact with the gutter, but instead would impact the recording medium at an unintended position. With respect to the problem of obtaining proper synchronization between the charge signal and drop break off, the prior art definitely recognized the criticality of the synchronization problem and many techniques have been proposed to test the drops for proper charging and adjust the synchronization between the charging signals and the perturbation means. The following U.S. Pat. Nos. are representative of the prior art:

Lewis et al., 3,298,030; Keur et al., 3,465,350; Keur et al, 3,465,351; Lovelady et al., 3,596,276; Hill et al., 3,769,630 (above); Julisburger et al., 3,769,632 and Ghougasian et al., 3,836,912.

The Lewis et al. patent describes drop synchronization using a phase shifter to insure proper charging of drops at the correct time. The Keur et al., U.S. Pat. No. 3,465,350, describes the use of a test 33 KHz. train of slightly narrow pulses to charge drops for deflection to a test electrode, which is impacted only by fully charged drops. The detector thus supplies an output signal only when the phasing is correct. The Keur et al., U.S. Pat. No. 3,465,351 describes similar charging of the drops and the placement of a target bar so that all drops strike the bar, together with an integrated measurement of the total current given out by the drops to indicate proper or improper phasing. In both patents, the 33 KHz. charging rate for the test signals is the normal charging rate for the printing video signals. The Lovelady et al. patent also charges each drop of the stream to impact the gutter and directly compare the resultant gutter voltage against the reference voltage to establish whether the appropriate phase relationship exists. The Hill et al. patent discloses a dual gutter arrangement for using the voltage resulting from drops impacting at either extreme of deflection for detecting whether proper phasing has been achieved. The Julisburger et al. patent discloses the use of slightly narrow selective phase charging signals for testing the phase adjustment of each of a series of drops and an induction sensing means and digital phase detection circuitry for determining whether the drops are properly synchronized. The Ghougasian et al. patent is directed to a specific induction sensing means located near the charge electrode and prior to the deflection means useful for synchronization.

With the exception of the Keur et al., U.S. Pat. No. 3,465,350 and the Ghougasian et al. patents, all of the foregoing art is subjected to very poor signals and noise ratios on the detected signals and, as the result, is subject to a high probability of inaccuracy, or requires an intricatee array of shielding to attempt to reduce the signal to noise to usable levels. The Ghougasian et al. patent simply describes an induction sensor which may be utilized with the system of the Julisburger patent. The Keur et al. U.S. Pat. No. 3,465,350 is primarily an aiming test which may be effected by other parameters.

U.S. Pat. No.. 3,969,733 of Richard A. DeMoss et al. which is assigned to the assignee of the present invention, teaches subharmonic charging and detection of charging phase synchronization in an ink jet system which employs electrostatic deflection of individual ink jet droplets. The phase control employs filtration/narrow-band amplification at a subharmonic frequency from the normal drop repetition frequency, such that noise and extraneous drop rate machine signals are filtered. Sensing is accomplished by an inductive charge sensing element operative with the gutter, and detection of the filtered sent signals by integration and by level detection is then provided to control circuitry for effecting the subsequent control of charging of the ink droplets.

Each of the above discussed prior art patent deals with drop formation efficiency. The drop formation efficiency is effected by the formation of droplets and accordingly is also effected by the formation of satellite droplets. This is so, since satellite droplets either merge in a forward or rearward direction, causing droplets of different size, and which arrive at the charging point at an incorrect time. Accordingly, spots on the recording medium are registered with different sizes, and at imprecise locations.

An article entitled "Investigation of Nonlinear Waves on Liquid Jets," appearing in The Physics of Fluids, Vol. 19, No. 8, August 1976 by Howard H. Taub describes the spectrum analysis of a liquid jet by the use of an optical probe. There is, however, no teaching of the use of the results of the spectrum analysis in a feedback control system to conrol the formation of satellite droplets in an ink jet printing system.

U.S. Pat. No. 3,928,855 of Helinski et al. discloses method and apparatus for controlling satellites in a magnetic ink jet printing system through the use of an asymmetrical perturbation. The asymmetrical excitation signal, such as a sawtooth wave, has substantial second and/or third harmonic content, which results in an excitation signal with different rise and fall times for producing an ink jet stream free of satellite droplets. There is, however, no teaching of providing the asymmetrical excitation signal as a function of a feedback control signal which results from sensing the surface profile of the ink jet stream prior to drop break off.

The existence of satellite droplets in an ink jet printing system is undesirable for the reasons set forth above. Two methods presently exist for satellite elimination, namely, utilizing a good head design which provides a good satellite print window, that is no satellites, by virtue of driving the piezoelectric transducer within a predetermined range of voltages, or utilizing harmonic injection.

A good head design would provide the best solution, however at the present time head design is inadequately understood and print windows are relatively unpredictable even when comparing two heads of ostensibly the same design. Moreover, elimination of satellites frequently require driving the piezoelectric driver quite hard with the result that the break off distance is shorter than desired when the whole head design is considered. For example, oftentimes there is inadequate space left for an airduct and charge electrode. This is particularly true for small nozzles having an orifice of 0.7 mls. or less. In addition, while it is usually possible to eliminate satellites, it is extremely difficult, if not impossible, to precisely control the droplet break off geometry.

Insertion of harmonics into the piezoelectric driver is a viable means for overcoming this problem, since appropriate harmonics can, in principle be injected to control the break off geometry for a predetermined drop rate. This technique however, is somewhat unstable with day-to-day and on-off operation and even over periods of hours with the head in continuous operation. This may result, for example, from the formation or movement of air bubbles in the head or from structural changes of the head due to temperature variation.

Also, in some systems, droplet characterics are determined in response to the sensing of droplets downstream from the charging electrode. Accordingly, the droplets then are effected by drop-to-drop retardation due to aerodynamic effects, as well as charge repulsion effects from droplet-to-droplet. At this downstream point, essentially all drop break off characteristics are lost.

Any variations in head geometry influence the efficiency at which the applied electrical perturbation drive signal is converted to a mechanical perturbation by the piezoelectric transducer on the ink jet manifold. Accordingly, the mechanical perburtation is influenced by different harmonic components of the drive signal in different ways. This in turn may result in a change in the drop formation geometry, which might give rise to a satellite droplet in a previously satellite-free condition, or more generally may correspond to a change in the shape of the droplet formed at the break off point. Since the charging efficiency of droplets breaking off within the charge electrode depends on the shape of the droplet at break off, the efficiency may be adversely affected.

The ideal time to sense the frequency, phase and amplitude components of the ink jet stream for determining drop break off characteristics is at the precise time droplets are formed therefrom. This is usually impossible to achieve, however, since the droplets are normally formed inside the charge electrode. Therefore, according to the present invention the drop break off characteristics are determined by sensing upstream of break off, rather than downstream as taught by the prior art. The continuous portion, that is the portion just prior to break off of the stream is sensed to determine the break off characteristics. In response to the sensed characteristics, a piezoelectric drive signal is provided which controls droplet formation, and accordingly provides increased drop charging efficiency.

SUMMARY OF THE INVENTION

According to the present invention, method and apparatus is set forth for controlling the formation of droplets in an ink jet stream. The stream is illuminated in a region where the stream has yet to break up to form droplets. The surface wave profile produced by illuminating the stream is sensed to provide a first signal at a frequency F, and at least a second signal at a frequency $n$F, where $n$ is an integer $\geqq 2$. The first and second signals are combined to provide a control signal which is used to excite the ink jet stream, which excitation controls the formation of droplets.

DETAILED DESCRIPTION OF THE INVENTION

Figure 1A:
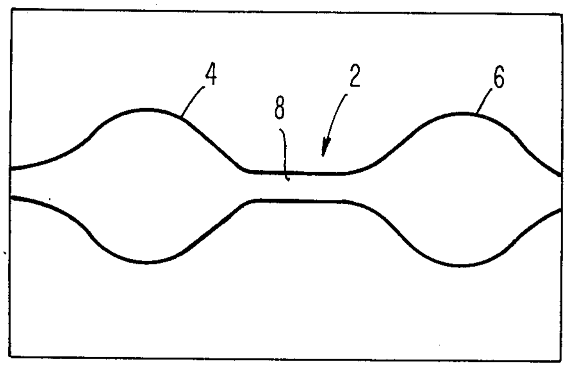
FIGS. 1A–1C are pictorial representations illustrating how an ink jet stream breaks up to form droplets, including the formation of satellite droplets as determined by an optical probe system.
Figure 1B:
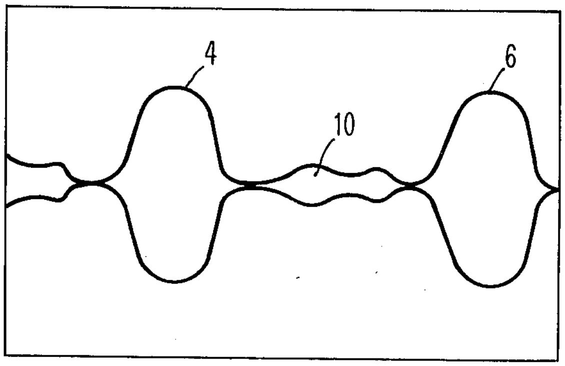
Figure 1C:
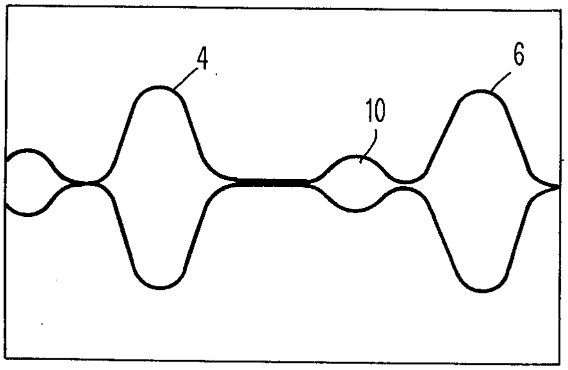

In an ink jet stream, an initial sinusoidal perturbation becomesnon-sinusoidal close to the point of drop formation, that is, the point at which the surface wave amplitude equals the radius of the jet, with a thin cylindrical thread of fluid forming which connects adjacent wave peaks. This thread usually detaches separately to form what is termed a satellite droplet, which subsequently merges rearward or forward with a primary droplet. This may be seen, in relation to FIGs. 1A–1C. In FIG. 1A, an ink jet stream 2 is seen to become non-sinusoidal as it nears the point of drop formation, with primary droplets 4 and 6 being formed with a thin cylindrical thread 8 attaching the droplets. In FIG. 1B it is seen that the thread 8 begins to form into a satellite droplet 10, with the droplets 4 and 6 becoming more cylindrical in shape. With reference to FIG. C, it is seen that the satellite droplet 10 becomes more cylindrical in shape just before detaching from the primary droplets 4 and 6. As stated above, the satellite droplet 10 either merges rearward or forward with the droplets 4 and 6. The control of the shape of a given droplet at the point of break off from an ink jet stream, and accordingly the formation of the satellite droplet 10 makes it possible to more accurately charge the primary droplets 4 and 6, and accordingly to more precisely control the exact points at which the droplets 4 and 6 impinge upon a printing medium.

According to the present invention, the break up of the ink jet stream is spectrum analyzed using a sensitive, high resolution optical system that generates an electrical signal proportional to the local jet diameter. By optically converting the surface wave profile of the jet to a periodic electrical signal, displacements on the jet of less than 1,000A are measured. This periodic electrical signal may be processed utilizing signal processing techniques, one such technique being the resolution of the signal into its harmonic components with a subsequent determination of the amplitude of and relative phases between the fundamental and harmonic components. A laser emits radiant energy at the ink jet stream, with the radiant energy which is not blocked by the stream being passed through a slit in a substrate. A photomultiplier tube, for example a diode detector senses the light passed through the slit, with the light being converted to an electrical signal which is then spectrum analyzed. The ink jet fluid comprising a jet is an aqueous ink solution which is highly opaque to laser light, and consequently the image of the jet is a well-defined shadow which reduces the light intensity reaching the photomultiplier tube. The measured intensity is related to the slit height $h$ and the diameter of the jet shadow $D$ by $I = I_O(1\text{-D/H})$, where $I_O$ is the intensity measured when there is no shadow over the slit. If the jet has an axisymmetric disturbance on it, the diameter is changed locally both as a function of position along the jet axis $Z$ and as a function of time $t$, that is, $D = D(Z,t)$. The slit height is chosen to be somewhat larger than the largest diameter to be measured to minimize diffraction effects and to prevent clipping of the electrical wave form.

Figure 2:
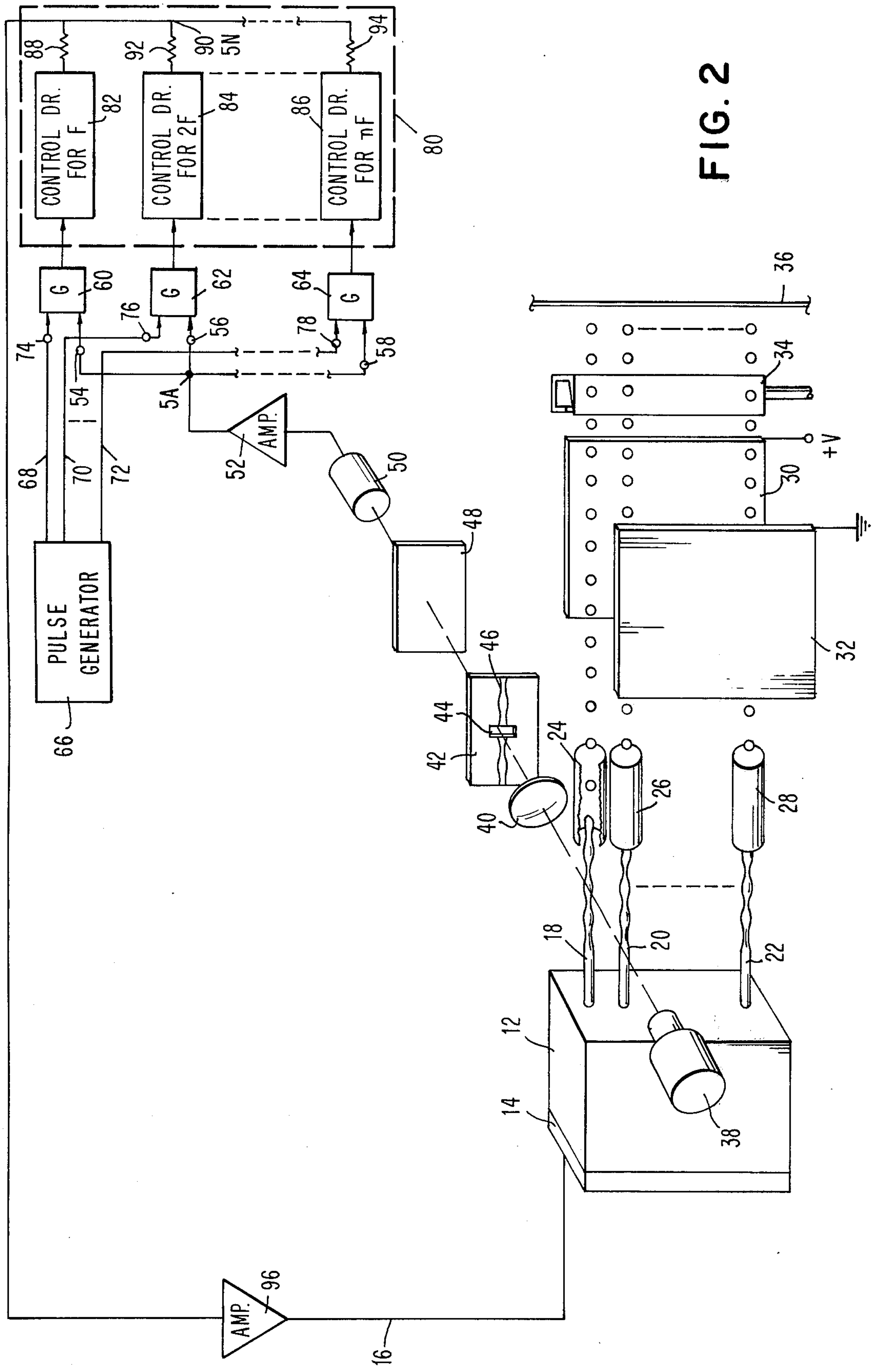
FIG. 2 is a schematic and block diagram representation of an ink jet synchronization system according to the present invention.
Figure 5A:
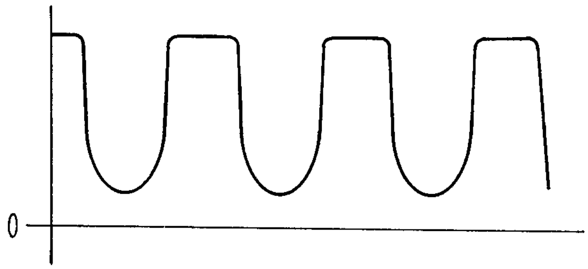
FIGS. 5A–5N are wave shape relationship diagrams illustrating wave shapes present in the schematic and block diagrams illustrated in FIGS. 2–4.

A system for measuring ink jet breakup characteristics, and for generating a control signal which is used to perturb an ink jet stream, and accordingly control the formation of droplets, and the shape of a given droplet at the point of break-off from the stream is illustrated in FIG. 2. An ink jet manifold 12 has a perturbation means, such as a piezoelectric crystal 14, connected thereto, with the crystal 14 being excited by a control signal appearing on an input line 16. A plurality of ink jets 18, 20 and 22 are emitted from the manifold 12, with the streams breaking up to form droplets in charge electrode structures 24, 26 and 28 respectively. The charge electrode structures are pulsed in a well known manner to selectively apply charge to the droplets, with the droplets passing through deflection plates 30 and 32 which control the flight of the droplets to a gutter 34 or to a printing medium 36 in accordance with the presence or absence of charge on the droplets. A source of radiant energy 38, which for example may comprise a He-Ne laser, emits radiant energy which is focused on the continuous portion of the jet 18 just prior to the jet entering the charge electrode structure 24. Since the ink is opaque, a shadow is formed which is imaged through a lens 40 onto a substrate 42 which has a slit 44 formed therein. The slit may be on the order of 3 × 0.2 mil, with the substrate 42 being silicon, and with the slot 44 being etched therein utilizing known silicon etching techniques. A slit having significantly larger dimensions may be used, if lens 40 is chosen to be a magnifying lens. The shadow 46 represents the surface wave profile of the jet 18, which is a representation of the respective amplitudes and relative phases of the fundamental and harmonic frequencies with respect to one another. The light passing through the slit 44 is influenced by the wave passing a given point on the perimenter of the jet, and accordingly is a representation of the frequency components of the jet at this particular point, as well as being indicative of the shape of a given droplet when it breaks-off downstream. It is necessary to make the slit somewhat larger than the largest diameter to be measured, typically the drop diameter, so that the clipping of the wave form does not occur, as well as preventing the generation of spurious diffraction effects. A narrow band pass filter 48, which has a band pass on the order of 100A centered at the laser wavelength, is used so measurements may be made in room light. The light passed by the filter 48 is then transmitted to a photomultiplier tube 50 which measures the intensity of the light. Therefore, the output voltage from the photomultiplier tube 50 is proportional to the diameter of the jet blocking the slit, which is to say, to the local diameter of the jet at the point being probed. This diameter fluctuates periodically as the travelling wave passes the slit. The electrical signal output from the photomultiplier tube 50 is then passed by an amplifier 52 (FIG. 5A) to the signal inputs 54, 56, and 58 of gates 60, 62 and 64, respectively. A pulse generator 66 provides gating signals via lines 68, 70 and 72 to gating inputs 74, 76 and 78 of the gates 60, 62 and 64, respectively. Accordingly, the signal output from the amplifier 52 is passed by the gates 60, 62 and 64 in a timed sequence to a frequency analyzing means 80 which is comprised of control and driver circuits 82, 84 and 86, respectively. It is to be appreciated that the signal output from amplifier 52 may be applied to analyzing means 80 by other timing means such as a stepping motor, or alternatively may be applied concurrently to the inputs of devices 82, 84 and 86, rather than in the timed sequence described.

Figure 5B:
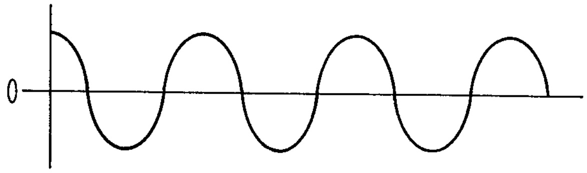
Figure 5C:
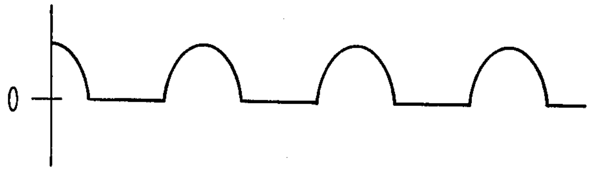
Figure 5D:
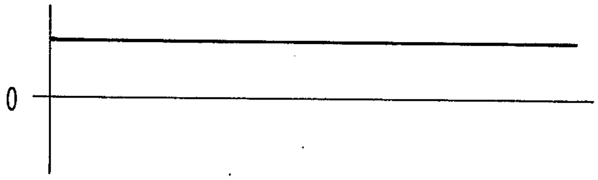
Figure 5E:
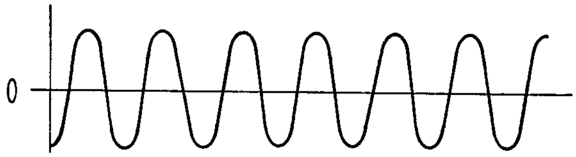
Figure 5F:
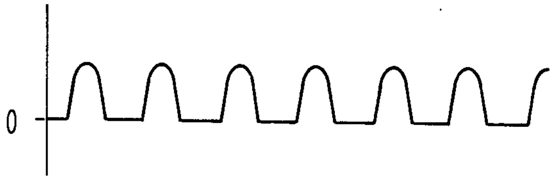
Figure 5G:
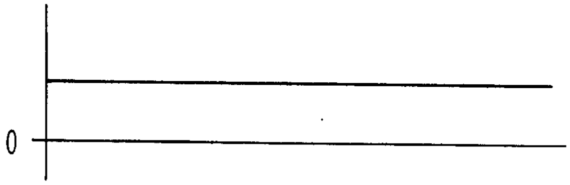

Control and driver circuit 82 responds to the fundamental frequency "F" portion of the input signal and provides a signal output at a fixed frequency F with an amplitude proportional to the difference between the detected amplitude of the input signal and a reference voltage. The output signal is passed through a summing resistor 88 to a summing node 90 (FIG. 5N) for summation with signals outputs from the control and driver circuits 84 and 86. The control and driver circuit 84 responds to the second harmonic of the signal passed by the gate 62, that is, the signal component "2F," the output signal therefrom having a fixed frequency 2F with the amplitude and relative phase thereof being determind with respect to the input signal and the fundamental frequency component from circuit 82, with the output signal therefrom being applied by way of a summing resistor 92 to the summing node 90. A number of other control and driver circuits 86 may be included for analyzing the higher order harmonic components *n,* with the output signal from the circit 86 having a frequency *n*F with an amplitude and phase being determined by the input signal thereto relative to the fundamental frequency component from circuit 82, with the output signal being applied via a summing resistor 94 to the summing node 90. The fixed frequency variable amplitude and phase signal appearing at the summing node 90 (FIG. 5N) is applied to an isolation amplifier 96 which applies this signal as a control signal on the line 16 to the perturbation means 14 for controlling the formation of droplets and the shape thereof at breakoff, and accordingly the formation or suppression of satellite droplets in the system.

Figure 3:
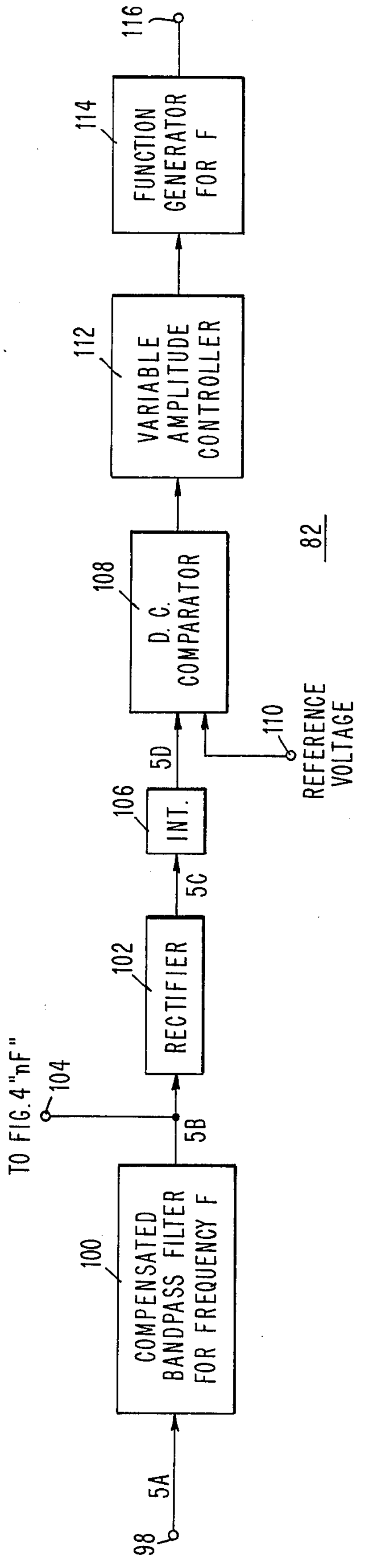
FIG. 3 is a detailed block diagram representation of the control and driver circuit for "F," which is illustrated generally in FIG. 2.

FIG. 3 is a block diagram representation of the control and driver circuit 82 for "F" illustrated in FIG. 2. An input terminal 98 receives the periodic input signal (FIG. 5A) from the amplifier 52 (FIG. 2). This signal is passed by a compensated band pass filter 100 for frequency F, which provide a periodic signal (FIG. 5B) to a rectifier 102 and an output terminal 104. The periodic signal manifested at the terminal 104 is provided to the control and driver circuits 84 and 86 as a fundamental frequency reference signal, the function of which will be explained shortly. The rectifier 102 is a half-way rectifier which provides a rectified signal (FIG. 5C) to an integrator 106 which provides a d.c. output signal (FIG. 5D) to a first input od a d.c. comparator 108. The signal input from the integrator 106 is a d.c. level proportional to the amplitude of the sinusoidal signal appearing at the output of filter 100. This level is compared in the comparator 108 with a desired reference level applied to an input terminal 110 of the comparator. Ifthe two inputs are found to be different, the output of the comparator is non-zero which activates a variable amplitude controller 112. The amplitude controller 112 for example, may comprise a servo motor controlling a potentiometer. The controller's output is applied to a function generator for F 114 which provides an output signal at a terminal 116 at the fundamental frequency F with an amplitude proportional to the input signal from the controller 114. The amplitude, therefore, of the signal at frequency F appearing at the terminal 116 is indicative of the difference between the amplitude of the sensed input signal at frequency F, and the reference signal appearing at terminal 110. The output signal at terminal 116 is then applied via the summing resistor 88 (FIG. 2) to the terminal 119 for summation with the output signal from the controllers 84 and 86, and is also applied as a reference signal to the trigger input of the Function generator 134 for "*n*F" as illustrated in FIG. 4.

Figure 4:
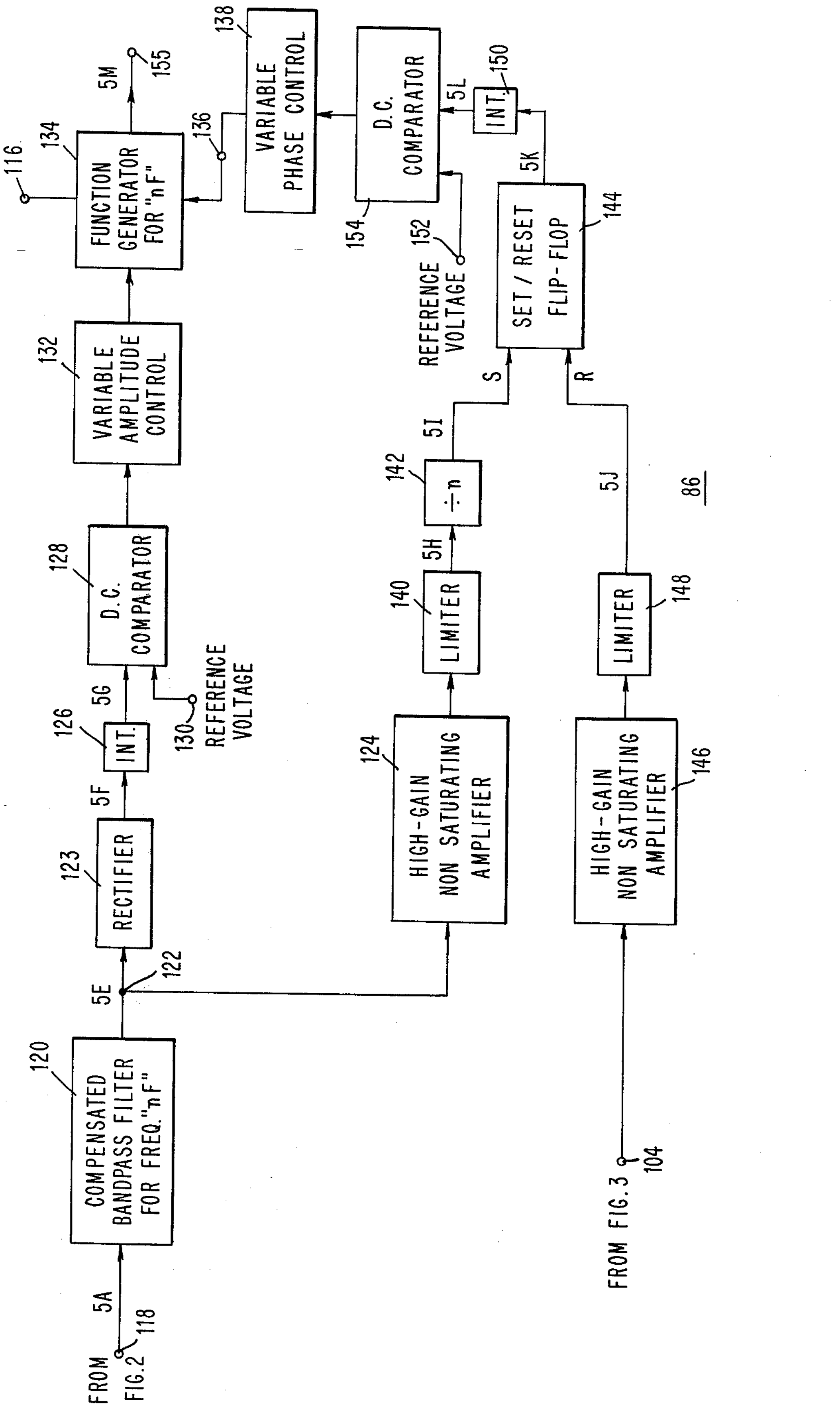
FIG. 4 is a detailed block diagram representation of the control and driver circuit for "$n$F," which is illustrated generally in FIG. 2.

FIG. 4 is a block diagram representation of a control and driver circuit for the various *n* harmonic frequency components, and in this instance the frequency "*n*F," and is exemplary of the driver circuit 84 when $n=2$ and the driver circuit 86 for all other values of *n.* Applied to an input terminal 118 is the output signal (FIG. 5A) from the amplifier 52 (FIG. 2), which is applied to a compensated band pass filter 120 for frequency "*n*F" which provides an output signal at a terminal 122 (FIG. 5E) which is a periodic signal at the harmonic frequency *n*F, and is illustrated for the second harmonic component when $n=2$. This signal is applied to a half-way rectifier 123 and to a high-gain nonsaturating amplifier 124. The rectifier 123 provides a rectified signal (FIG. 5F) at its output, which is applied to an integrator 125 which provides an output signal (FIG. 5G) having a d.c. level proportional to the amplitude of the sine wave at frequency *n*F. This signal is compared in a d.c. comparator 128 with a reference voltage applied to an input terminal 130. If the two d.c. level inputs are different, the output of the comparator 128 is non-zero which activates a variable amplitude controller 132. The controller 132, for example, may comprise a servo motor controlling a potentiometer. The output signal from the controller 132 is applied to the input of a function generator for "*n*F" providing an output signal at a frequency *n*F. The generator 134 also receives the output of the function generator for F at the terminal 116 and the output from a variable phase controller 138 at a terminal 136.

Figure 5H:
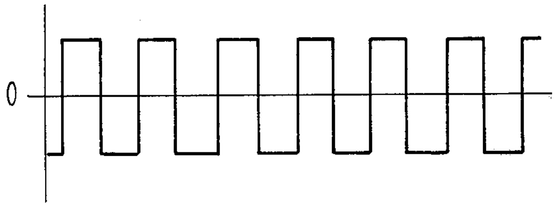
Figure 5I:
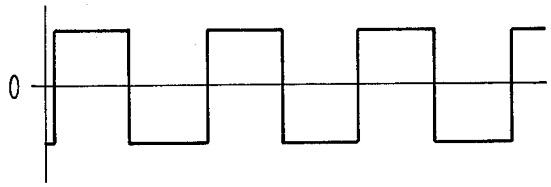
Figure 5J:
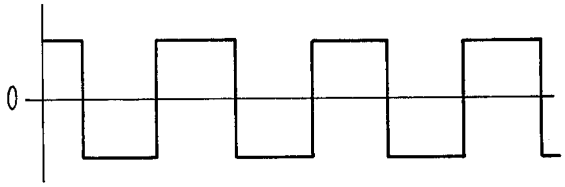
Figure 5K:
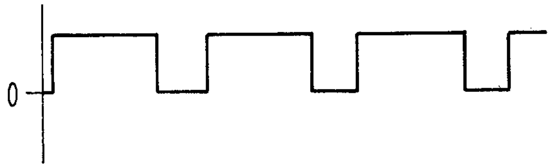
Figure 5L:
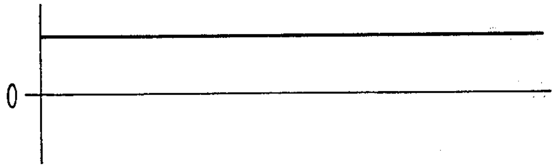
Figure 5M:
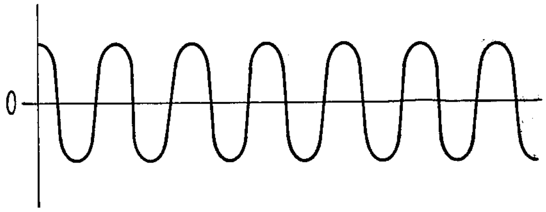
Figure 5N:
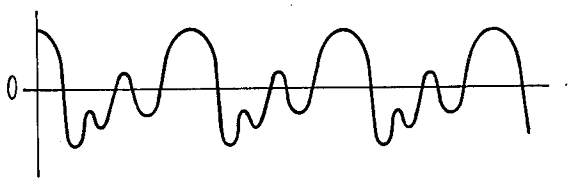

The relative phase of the harmonic component "*n*F" with respect to the fundamental component "F" is determined by passing the signal at terminal 122 through a high gain nonsaturating amplifier 124 and a limiter 140 for providing a periodic square wave signal at the frequency *n*F (FIG. 5H). This signal is then provided to a divide by *n* circuit 142 which provides a signal at the fundamental frequency F to the set input of a set re-set flip flop 144. The reference sinusoidal signal at frequency F from terminal 104 (FIG. 3) is applied to the input of a high gain nonsaturating amplifier 146 with the output therefrom being applied to a limiter circuit 148 which provides an output square wave signal (FIG. 5J) at the fundamental frequency F to the re-set terminal of theset re-set flip flop 144. The two input signals to the flip flop 144 are of equal frequency as a result of the divide by $n$ operation by the network 142 on the harmonic frequency component. If the respective signals are 180° apart, the resulting output signal (FIG. 5K) from the flip flop 144 is a square wave with a 50% duty cycle. The duty cycle deviates from 50% if the phase angle between the S and R input signals deviates from 180°. The output signal (FIG. 5K) is then applied to an integrator 150 which generates a d.c. level (FIG. 5L) proportional to the phase difference, which signal is compared to a reference voltage which is applied to a terminal 152 of a d.c. comparator 154. The output of the d.c. comparator 154 is applied to a variable phase control network 138, which may be a servo motor controlling a potentiometer, which applies a d.c. level output to the input terminal 136 of the function generator 134. This d.c. level is proportional to the relative phase difference between the fundamental frequency component F and the harmonic frequency component $n$F. The output from the function generator $n$F is then applied to an output terminal 155 and in turn to the summing resistor 94 (FIG. 2) and then to the summing point 90 for summation of the fundamental frequency component F and the other harmonic components. The signal appearing at terminal 155 (FIG. 5M) is a signal at the harmonic frequency $n$F, and having an amplitude and relative phase determined by the amplitude of the sensed harmonic frequency component and the relative phase difference of the sensed harmonic frequency component relative to the fundamental frequency component.

Referring once again to FIG. 2, the signal appearing at the summing terminal 90 (FIG. 5N) is a signal at the fixed frequency $n$F, including the harmonic components thereof, which signal is then used, as previously explained, to control the perturbation of the perturbation means 14, and accordingly the drop break off characteristics of the respective ink jet streams.

What is claimed is:

1. In an ink jet printing system, a method of controlling the formation of droplets in an ink jet stream, said method comprising the steps of:
- illuminating said ink jet stream in a region where the stream has yet to break up to form droplets;
- sensing the surface wave profile of the illuminated ink jet stream;
- responding to the sensed surface wave profile for providing a first signal at a frequency F;
- responding to the sensed surface wave profile for providing at least a second signal at a freuqency $n$F, where $n$ is an integer $\geqq 2$; and
- combining said first and second signals to provide a control signal which is used to excite said ink jet stream, which excitation controls the formation of droplets.

2. In an ink jet printing system, a method of controlling the formation of droplets in an ink jet stream, said method comprising the steps of:
- illuminating the continuous portion of said ink jet stream with a source of radiant energy;
- sensing the surface wave profile of the illuminated ink jet stream;
- responding to the sensed surface wave profile for providing a first signal at the fundamental frequency F of the ink jet stream; responding to the sensed surface wave profile for providing at least a second signal at a frequency $n$F, where $n$ is an integer $\geqq 2$; and summing said first and second signals to provide a control signal which is used to excite said ink jet stream for controlling the formation of droplets.

3. The method of claim 2, wherein said radiant energy source comprises a laser.

4. In an ink jet printing system, apparatus for controlling the shape of droplets at break-off in an ink jet stream, said apparatus comprising:
- means for illuminating said ink jet stream in a region where the stream has yet to break up to form droplets;
- means for sensing the surface wave profile of the illuminated ink jet stream;
- means responsive to the sensed surface wave profile for providing a first signal at a frequency F, the amplitude of which is a function of the sensed surface wave profile;
- means responsive to the sensed surface wave profile for providing at least a second signal at a frequency $n$F, where $n$ is an integer $\geqq 2$, with the amplitude and phase of said second signal being a function of the sensed surface wave profile; and
- means for combining said first and second signals to provide a control signal which is used to excite said ink jet stream, for controlling the shape of droplets at break-off from said ink jet stream.

5. In an ink jet printing system apparatus for controlling the shape of the droplets at break-off in an ink jet stream, said apparatus comprising:
- means for illuminating the continuous portion of said ink jet stream with a source of radiant energy;
- means for sensing the surface wave profile of the illuminated ink jet stream;
- means responsive to the sensed surface wave profile for providing a first signal at the fundamental frequency F of the ink jet stream,the amplitude of which is a function of the sensed surface wave profile;
- means responsive to the sensed surface wave profile for providing at least a second signal at a frequency $n$F, where $n$ is an integer $\geqq 2$, with the amplitude and phase of said second signal being a function of the sensed surface wave profile; and
- means for summing said first and second signals to provide a control signal which is used to excite said ink jet stream for controlling the shape of droplets at break-off from said ink jet stream.

6. The apparatus of claim 5, wherein said radiant energy source comprises a laser.

7. In an ink jet printing system, apparatus for controlling the shape of droplets at the point of break-off in an ink jet stream, said apparatus comprising:
- a source of ink which emits an ink jet stream;
- perturbation means for perturbing said source of ink for causing the formation droplets;
- means for illuminating the continuous portion of said ink jet stream with a source of radiant energy;
- means for sensing the surface wave profile of the illuminated ink jet stream, and for converting same to an electrical signal containing the frequency components of the sensed radiant energy;
- a first means responsive to said electrical signal for providing a first signal at the fundamental frequency F of the ink jet stream, the amplitude of which is a function of the sensed fundamental frequency component of the sensed surface wave profile;

a second means responsive to said electrical signal for providing at least a second signal at a frequency $n$F, where $n$ is $\geqq 2$, with the amplitude and phase of said second signal being a function of the sensed fundamental and nth frequency of the sensed surface wave profile; and means for summing said first and second signals to provide a control signal which is applied to said perturbation means for controlling the perturbation of said ink jet stream and the shape of droplets at the point of break-off from said ink jet stream.

8. The combination claimed in claim 7, wherein said means for illuminating comprises a laser.

9. The combination claimed in claim 7, wherein said first mean comprises:

a bandpass filter for passing a sinusoidal signal at the fundamental frequency F;

a rectifier for rectifying said sinusoidal signal;

an integrator for integrating the rectified sinusoidal signal for providing a direct current signal proportional to the amplitude of the sinusoidal signal;

a comparator for comparing said direct current signal with a reference signal; and means for providing said first signal at the fundamental frequency F in response to the comparison.

10. The combination claimed in claim 9, wherein said first means comprises:

a bandpass filter for passing a sinusoidal signal at the frequency $n$F;

a rectifier for rectifying said sinusoidal signal;

a first integrator for integrating the rectified sinusoidal signal for providing a first direct current signal proportional to the amplitude of the sinusoidal signal at frequency $n$F;

means for providing a periodic signal, the frequency of which is a function of said sinusoidal signals at frequency F and $n$F;

a second integrator for integrating said periodic signal for providing a second direct current signal; and means for providing said second signal in response to the provision of said first and second direct current signals.

* * * * *